(12) United States Patent
Gupta et al.

(10) Patent No.: US 9,986,474 B2
(45) Date of Patent: May 29, 2018

(54) INTERFERENCE AND LOAD AWARE DYNAMIC POINT SELECTION

(71) Applicant: Nokia Solutions and Networks Oy, Espoo (FI)

(72) Inventors: Richa Gupta, Bangalore (IN); Balamurali Natarajan, Bangalore (IN); Suresh Kalyanasundaram, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 163 days.

(21) Appl. No.: 14/881,251

(22) Filed: Oct. 13, 2015

(65) Prior Publication Data

US 2016/0105834 A1    Apr. 14, 2016

(30) Foreign Application Priority Data

Oct. 14, 2014 (IN) .......................... 2963/DEL/2014

(51) Int. Cl.
*H04W 24/00* (2009.01)
*H04W 36/00* (2009.01)
*H04L 5/00* (2006.01)

(52) U.S. Cl.
CPC .......... *H04W 36/0083* (2013.01); *H04L 5/00* (2013.01)

(58) Field of Classification Search
None
See application file for complete search history.

(56) References Cited

U.S. PATENT DOCUMENTS

2012/0281556 A1* 11/2012 Sayana ................. H04B 7/024
                                                          370/252
2013/0084864 A1*  4/2013 Agrawal ........... H04W 36/0083
                                                          455/436

OTHER PUBLICATIONS

Agrawal, Rajeev, et al., "Dynamic Point Selection for LTE-Advanced: Algorithms and Performance", © 2014 IEEE, 6 pgs.
Borst, Sem, "User-level Performance of Channel-Aware Scheduling Algorithms in Wireless Data Networks", © 2003 IEEE, 11 pgs.
Son, Kyuho, et al., "Dynamic Association for Load Balancing and Interference Avoidance in Multi-Cell Networks", © 2009 IEEE, 11 pgs.
Gupta et al.; "Inventors' Statements"; Jun. 10, 2014; 1 page.

* cited by examiner

*Primary Examiner* — Edan Orgad
*Assistant Examiner* — Sithu Ko
(74) *Attorney, Agent, or Firm* — Harrington & Smith

(57) ABSTRACT

Apparatuses, methods, computer programs, computer program products and computer-readable media regarding connection establishment robustness optimization are disclosed. Some example versions include calculating, at a base station, a switching metric for a user equipment served by the base station, the switching metric indicating whether the user equipment is to switch from a source cell to one of multiple target cells. The switching metric is calculated for a combination of the user equipment with a source cell and one of the multiple target cells. The base station determines whether to switch the user equipment from the source cell to one of the multiple target cells based on the switching metric, which includes spectral efficiencies of the user equipment for both the source cell and one of the multiple target cells, current cell load values for both the source cell and one of the multiple target cells and a correction factor.

17 Claims, 4 Drawing Sheets

INTERFERENCE AND LOAD AWARE DYNAMIC POINT SELECTION

FIELD OF THE INVENTION

The present invention relates to apparatuses, methods, systems, computer programs, computer program products and computer-readable media regarding interference and load aware dynamic point selection.

BACKGROUND OF THE INVENTION

Dynamic Point Selection (DPS) is a key downlink Coordinated Multipoint (CoMP) technique that switches the serving data Transmission Point (TP) of a User Equipment (UE) dynamically among the UE's cooperating sets of TPs without requiring a cell handover. A TP is defined as a set of geographically collocated transmit antennas. The prominent benefits of Dynamic Point Selection include performance improvement due to TP selection-diversity gains and dynamic UE load balancing benefits.

DPS switches the serving TP of the UE based on the UE's channel and the cell load conditions. This TP switching can be done on a very fast time scale without requiring an elaborate handover procedure.

In this regard, it is described in document [1], that LTE Release 11 allows cell-agnostic DL CoMP operation by introducing a new framework for multi-cell channel state information (CSI) feedback from the UE based on an enhanced downlink reference signal structure. Each UE is configured a CoMP measurement set, which is a set of CSI reference signal (CSI-RS) resources for which the UE is required to measure and feedback the CSI. The configuration of this CoMP measurement set is UE-specific and can be determined based on the UE's mobility measurements (for example, RSRP) or the UE's uplink sounding reference signal (SRS) transmissions. Typically, each CSI-RS resource would correspond to a TP.

Moreover, it is mentioned that for each TP included in the UE's CoMP measurement set, the UE is configured with at least one independent CSI process feedback. The UE determines the CSI of a configured CSI process by using the associated non zero power (NZP) CSI-RS resources (which are used to measure the desired signal power) and the newly defined interference measurement resources (IMRs) (which are used to measure the interference power). Up to a maximum of three different NZP CSI-RS and IMRs can be configured for a UE, which limits the CoMP measurement set to three TPs for each UE.

The CoMP transmission set of a UE (which is the set of cooperating TPs from within which a UE's serving TP can be selected) comprises the top N TPs with the largest Reference-Signal Received Power (RSRP) values measured by the UE from within the "liquid cluster" [1] of the UE's serving TP.

The cell on which UE performs RRC (radio resource control) attach procedure, is called primary TP and the other cells in the CoMP transmission set are called serving TPs if UE switches to those cells.

Conventional DPS schemes, as described for example in document [1], consider the spectral efficiency and/or cell load to determine the current serving TP for a UE.

However, the conventional DPS schemes do not take into account the burstiness of the UE traffic and the resulting dynamics in the inter-cell interference caused by switching a UE to a different TP. For example, in case of load based DPS, a UE may be switched to a lightly loaded TP, even though this new TP is not the best TP for the UE in terms of spectral efficiency. This can increase the resource usage (in time and/or frequency) of the UE and hence, increase the inter-cell interference caused by data transmissions to the UEs. This effect is more pronounced in case of realistic unbalanced bursty traffic conditions as shown by the simulation results. The main problem lies in the fact that these current DPS schemes in [1] and [2] are greedy user schemes that are optimized for maximizing a single UE's throughput without considering its impact on the overall system performance. In [2], they have also considered multi-user diversity (MUD) gain factor in the UE switching metric (called in this application as MUD-IL-DPS when this MUD gain factor is applied to IL-DPS). The MUD-IL-DPS scheme accounts for the multi-user diversity gain while determining the throughput estimates of the UE in different candidate TPs. This MUD gain is obtained due to the opportunistic scheduling of the UEs by the PF scheduler. In document [2], an online estimation scheme of this MUD gain is described that provides better accuracy.

However, this method may not be practical as it requires the past knowledge of scheduling decisions and the scheduled data rates of all the active UEs in a cell over a fixed time window. For simplicity sake, in our simulation evaluation comparison, we use instead a simple mathematical formula for MUD gains as given in document [3] in the TP switching metric which only depends on the total number of active UEs competing for the resources.

The Geometric Mean (GM) of the UE throughputs is used as the metric to evaluate the system performance of the considered DPS schemes. This GM metric is shown to be a single metric that effectively captures the overall system performance, in case of the commonly used Proportional-Fairness (PF) based scheduling strategy. The typical industry-practice of using two metrics, average UE throughput, and cell-edge UE throughput can yield conflicting conclusions. Besides, it is noted that the proportional fairness metric is designed to maximize the geometric mean of UE throughputs, and hence using a different performance metric than what the scheduling strategy is maximizing may cause system designers to draw wrong conclusions.

REFERENCES

[1]: Rajeev Agrawal, Anand Bedekar, Richa Gupta, Suresh Kalyanasundaram, Hans Kroener, and Balamurali Natarajan, "Dynamic Point Selection for LTE-Advanced: Algorithms and Performance," WCNC 2014.

[2]: "Dynamic Association for Load Balancing and Interference Avoidance in Multi-Cell Networks" by Kyuho Son, Song Chong, *Member, IEEE*, and Gustavo de Veciana, in IEEE TRANSACTIONS ON WIRELESS COMMUNICATIONS, VOL. 8, NO. 7, JULY 2009.

[3]: S. Borst, "User-Level performance of channel-aware scheduling algorithms in wireless data networks", Proc. Infocom, March 2003, pp. 321-331.

SUMMARY OF THE INVENTION

It is therefore an object of some embodiments of the present invention to overcome, for example, the above mentioned problems and to provide apparatuses, methods, systems, computer programs, computer program products and computer-readable media regarding interference and load aware dynamic point selection.

According to an aspect of the present invention there is provided a method comprising:

calculating, at a base station, a switching metric for a user equipment served by the base station, the switching metric indicating whether the user equipment is to switch from a source cell to one of a plurality of target cells, the switching metric being calculated for a combination of the user equipment with source cell and one of the plurality of target cells, determining, by the base station, whether to switch the user equipment from the source cell to one of the plurality of target cells based on the switching metric, the switching metric comprising spectral efficiencies of the user equipment for both the source cell and one of the plurality of target cells, current cell load values for both the source cell and one of the plurality of target cells and a correction factor.

According to another aspect of the present invention there is provided an apparatus comprising:

at least one processor, and at least one memory for storing instructions to be executed by the processor, wherein the at least one memory and the instructions are configured to, with the at least one processor, cause the apparatus at least to perform:

calculating, at a base station, a switching metric for a user equipment served by the base station, the switching metric indicating whether the user equipment is to switch from a source cell to one of a plurality of target cells, the switching metric being calculated for a combination of the user equipment with source cell and one of the plurality of target cells, determining, by the base station, whether to switch the user equipment from the source cell to one of the plurality of target cells based on the switching metric, the switching metric comprising spectral efficiencies of the user equipment for both the source cell and one of the plurality of target cells, current cell load values for both the source cell and one of the plurality of target cells and a correction factor.

According to still another aspect of the present invention there is provided an apparatus comprising:

means for calculating, at a base station, a switching metric for a user equipment served by the base station, the switching metric indicating whether the user equipment is to switch from a source cell to one of a plurality of target cells, the switching metric being calculated for a combination of the user equipment with source cell and one of the plurality of target cells, means for determining, by the base station, whether to switch the user equipment from the source cell to one of the plurality of target cells based on the switching metric, the switching metric comprising spectral efficiencies of the user equipment for both the source cell and one of the plurality of target cells, current cell load values for both the source cell and one of the plurality of target cells and a correction factor.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of some aspects/embodiments of the present invention which is to be taken in conjunction with the appended drawings, in which.

DETAILED DESCRIPTION

Figure 1:
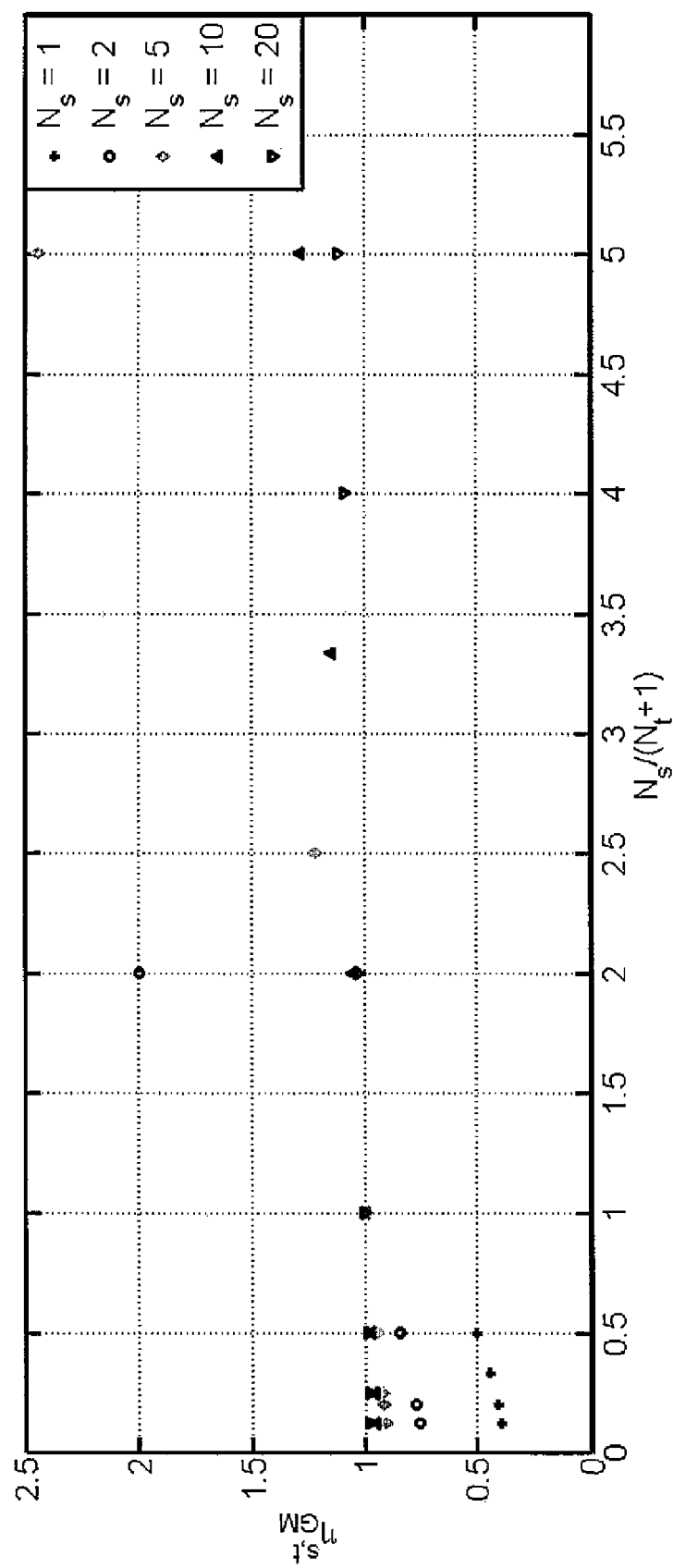
FIG. 1 is a diagram illustrating one example of the geometric mean correction factor for different values of $N_s$.

In the following, some example versions of the disclosure and embodiments of the present invention are described with reference to the drawings. For illustrating the present invention, the examples and embodiments will be described in connection with a cellular communication network based on a 3GPP based communication system, for example an Long Term Evolution (LTE)/Long Term Evolution Advanced (LTE-A) based system. However, it is to be noted that the present invention is not limited to an application using such types of communication systems or communication networks, but is also applicable in other types of communication systems or communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where some examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like Access Points (APs) and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

In the following, some example versions of the present invention will be described with respect to LTE Advanced, more specifically, with respect to Dynamic Point Selection (DPS) specified in LTE Rel-11.

However, it is noted that the present invention is not limited thereto and that the present invention can be used not only for DPS but for any problem related to load balancing for UE association with cells for handover or initial attach. Hence, the some embodiments of the present invention is applicable to all LTE users e.g. 3GPP Release 8,9,10 and Release 11,12 UEs.

According to some example versions of the present invention, the Instantaneous Load based DPS scheme (IL-DPS), as described in document [1] has been improved to work well under realistic bursty traffic conditions and load imbalanced scenarios, for example.

According to some example versions of the present invention, a correction factor (hereinafter also referred to as a multiplicative correction factor) is introduced, wherein this correction factor is calculated using two different methods. The first method is by using a geometric mean (GM) correction factor (called GM-IL-DPS when GM correction factor is applied to IL-DPS) which identifies a UE switch that maximizes overall system utility as opposed to a single UE's throughput. The second method is by using an interference correction factor (called IA-IL-DPS when interference correction factor is applied to IL-DPS) that accounts for the change in interference and its consequent impact on other UEs' throughput while determining the system utility improvement.

While, the above mentioned two new correction factors can be used in combination to fully estimate the gains from switching the Transmission Point (TP) of a UE, it is noted that the geometric mean correction factor and the interference correction factor could also be used alone or in any combination with other corrections factors.

Thus, the following additional aspects are considered according to some example versions of the present invention: the improvement achieved in the geometric mean of the user throughputs and/or the resultant change in the amount of the inter-cell interference caused due to switching a UE to a new target TP.

For example, some example versions of the present invention can provide improved system performance gains without requiring any additional scheduling information exchange.

The Instantaneous Load-based DPS scheme (IL-DPS) scheme described in document [1] is a simple greedy scheme in which the UE, that is estimated to obtain the largest percentage gain in its throughput, is switched to the TP that provides this gain. Performing IL-DPS over "liquid clusters" (TP-specific, overlapping clusters of cooperating TPs) has been shown to provide large system performance gains.

IL-DPS performs aggressive load balancing. Load balancing of TPs can lead to increased overall inter-cell interference in the network, which can offset the gains provided by the large amount of resources available to the cell-edge UEs that are switched to lightly loaded cells. The increase in inter-cell interference is due to UEs being served by cells with poorer spectral efficiency, which results in more resource usage thus reducing the natural "idle time" in cells due to absence of traffic.

It is noted that this is a phenomenon that can mainly be observed with "bursty" finite-buffer traffic and will not be seen in full-buffer traffic. As derivable from document [1], IL-DPS performs quite well for full buffer traffic. However, in large load imbalance scenarios, for example, there might arise the problem that in IL-DPS, UEs might for example be switched to cells with much poorer spectral efficiencies (SE) if the much lower load is seen to offset the decrease in SE.

However, the larger interference, for example, arising due to increased resource usage of the UE switched to lower SE cell is not captured in the IL-DPS metric.

According to some example versions of the present invention, this correction factor is taken into account in the switching metric.

While the IL-DPS scheme identifies and switches that UE that sees the largest percentage gain in its throughput, the GM-IL-DPS scheme intends to maximize the overall system performance. It switches that UE which results in the largest percentage gain in the geometric mean of the UE throughputs of all the active UEs in both the source TP (the current serving cell of the considered UE) and the target TP.

The IA-IL-DPS scheme accounts for the increase (or decrease) in the overall inter-cell interference caused when a UE is switched to a new target cell. It estimates the increase (or decrease) in the resources needed by the UE to predict the amount of change in the inter-cell interference.

These proposed schemes require no additional scheduling information apart from the already used metrics in IL-DPS like the UE's expected instantaneous throughput and the current cell load information. The UE's expected instantaneous throughput can be calculated from the UE's CSI feedback reports and the current cell load information can be exchanged (e.g. over X2 interface) among the cooperating cells.

In the following, the TP switching metric used in the IL-DPS scheme (cf. document [1]) will be described and then a common DPS UE switching procedure that is followed by all DPS schemes (including the new proposed schemes described below) will be described.

According to some example versions of the present invention as described herein, it is noted that the instantaneous rate (or spectral efficiency) denotes the throughput the UE would get if the UE is scheduled all the time and gets all the resources. In practice, due to other users in the cell, the actual throughput would be much lower. With other words, the instantaneous rate or spectral efficiency is the estimate of what data rate UE will get based on wideband channel quality indication reported by UE to eNodeB, assuming whole bandwidth available to this UE. The throughput is actual realized data rate based on what allocation UE has got given that there are other UEs also sharing the resources of the cell.

The UE's throughput estimate on any TP is determined as (Spectral Efficiency of the UE in that TP)/(Load of the TP), i.e.

$$T_k^s = \frac{r_k^s}{load_s} \text{ and } T_k^t = \frac{r_k^t}{load_t},$$

where $r_k^s$ is the spectral efficiency of UE k on TP s and $r_k^t$ is the spectral efficiency of UE k on TP t.

IL-DPS TP Switching Metric

This scheme uses both the spectral efficiency and the current load in the TPs to make the UE switching decisions. The TP switching metric of UE k for switching from source TP s to target TP t is given as follows:

$$S_{k,IL}^{s,t} = \frac{\left(\frac{r_k^t}{N_t+1}\right)}{\left(\frac{r_k^s}{N_s}\right)} \tag{1}$$

where the terms $N_s$ and $N_t$ are the number of currently active UEs in TPs s and t, respectively. It is noted that, as described in [1], use of the PF metric results in equal resource sharing among all UEs. This is true under the condition that all UEs are non-Guaranteed bitrate (non-GBR) UEs and have same quality-of-service (QoS) weights, which is an assumption that is made in this application in order to keep the description simple. Extension of the schemes in this application to the case of UEs with non-GBR traffic but different QoS weights is straightforward. Given this assumption, a UE that is sharing the resources of a cell with N−1 other UEs, gets 1/N share of the cell's resources. Thus, a UE's throughput with a spectral efficiency of r in a cell with N−1 other UEs will be proportional to r/N. It then follows that Equation (1) gives the ratio of the UE's estimated throughput in the target cell to that in the source cell.

Common DPS UE Switching Procedure

The common DPS procedure followed by all of the DPS schemes is given in the following 1) Among all the active UEs, select the UE k* (currently served by some source TP s) and the target TP (t=t*) that maximizes the TP switching metric $S_k^{s,t}$, provided $S_k^{s,t}$ is larger than 1.

$$(k^*, t^*) = \arg\max_{k \in A_t, t \in T_k} \{S_k^{s,t} | S_k^{s,t} > 1\} \tag{2}$$

where A is the set of all the active UEs considered for TP switching and $T_k$ is the set of all the TPs in the CoMP measurement set of the considered UE k other than the source cell s.

2) If such a UE k* exists in step 1), switch this UE k* from TP s to TP t* and then proceed to the next step. If not, the following steps are skipped.

3) Decrement and increment $N_s$ and $N_{t^*}$ respectively.

4) Remove UE k* from A:

$$A = A \Downarrow \{k^*\} \tag{3}$$

5) Repeat the above steps until either A becomes empty or there exists no UE k in A that satisfies the condition $S_k^{s,t}>1$.

The above procedure can be carried out every sub-frame or every T sub-frames, where T is referred to as the TP switching period. The above procedure can be carried out in a distributed fashion independently by each cell for the baseline SE-based DPS scheme [1] because the switching decision is based exclusively on the UE's CQI reports. However, for IL-DPS, knowledge of the number of active UEs in each cell is required.

According to some example versions of the present invention as described herein, to enable distributed operation of IL-DPS, we allow each cell to switch at most one UE until the next update of the number of active UEs from its neighbors. Therefore, the algorithm stops in step 5 when at least one UE has been switched from the cell or there exists no UE k in A that satisfies the condition $S_k^{s,t}>1$. Similarly, for the distributed version of the algorithm, each cell considers as candidate UEs in the set A only those UEs that are currently served by it. In the simulations and performance evaluations in this application, to be described later, the distributed version of the IL-DPS algorithm has been used.

In the following, the newly proposed schemes according to the geometric mean correction factor and the interference correction factor according to some example versions of the present invention will be described.

Geometric Mean Correction Factor

The PF scheduler solves the sum utility maximization problem, in which the logarithm of the user achieved throughput is used as the utility function (as given below).

$$\max \sum_i \log(T_i) \quad (4)$$

where $T_i$ is user i's achieved throughput, and the summation is over all users in the system. Or equivalently, for a fixed number of UEs, the PF scheduler maximizes $$\left(\prod_i T_i\right)^{(1/N)},$$

which is the geometric mean (GM) of UE throughputs.

Based on the above alternative formulation of the PF maximization criterion, the proposed GM-IL-DPS scheme switches a UE to a new TP only if the GM of the UE throughputs improves. Assuming that the UEs in other cells are not impacted by a particular UE in cell s moving to a cell t, then it is sufficient to check the gain in the product of throughputs of UEs in cells s and t alone. The GM-IL-DPS TP switching metric of UE k for switching from source TP s to target TP t is given by $$S_{k,GM}^{s,t} = S_{k,IL}^{s,t} \prod_{i \in A_s \cup A_t \setminus \{k\}} \frac{\hat{T}_i}{\overline{T}_i} \quad (5)$$

where $A_s$ and $A_t$ are the set of all currently active UEs in TPs s and t, respectively. The terms $\hat{T}_i$ and $\overline{T}_i$ are the estimated throughputs of UE i under the hypothesis that UE k is currently served by TP t and TP s, respectively. The GM-IL-DPS scheme makes the assumption that the UEs' throughputs are only impacted by the number of UEs in the cell, and does not account for any possible changes in the interference due to the switching of the UE.

Since the PF scheduler assigns an equal fraction of the cell's resources to UEs over time (cf. document [3], the throughput ratio $$\frac{\hat{T}_i}{\overline{T}_i}$$

of a given UE i (which is not currently considered for TP switching) and served by either the source or the target TP is only dependent on the resultant change in number of active UEs served by its TP. This approximation is valid since we assume that the Signal-to-Interference-plus-Noise (SINR) ratio of this UE j does not change due to the TP switching of UE k. In case, such a UE i is currently served by the source cell s, its throughput ratio is written as $$\frac{\hat{T}_i}{\overline{T}_i} = \frac{N_s}{N_s - 1} \quad (6)$$

Similarly, if this UE j is instead currently served by the target cell t, then this throughput ratio is given by $$\frac{\hat{T}_i}{\overline{T}_i} = \frac{N_t}{N_t + 1} \quad (7)$$

Substituting equation (6) and (7) in equation (5) and assuming $N_s$ is greater than 1, we get $$S_{k,GM}^{s,t} = S_{k,IL}^{s,t} \eta_{GM}^{s,t} \quad (8)$$

where $$\eta_{GM}^{s,t} = \left(\frac{N_s}{N_s - 1}\right)^{N_s - 1} \left(\frac{N_t}{N_t + 1}\right)^{N_t} \quad (9)$$

For the special case when $$N_s = 1, \left(\frac{N_s}{N_s - 1}\right)^{N_s - 1}$$

is set to unity. Similarly, when $N_t = 0$, $$\left(\frac{N_t}{N_t + 1}\right)^{N_t}$$

is set to unity.

It is noted that $S_{k,GM}^{s,t}$ is dependent only on the estimated throughputs of the UE considered for switching and the number of currently active UEs in the source and target TPs, and hence does not require any other extra information from the neighboring TPs. FIG. 1 plots one example of the geometric mean correction factor $\eta_{GM}^{s,t}$ as a function of $$\frac{N_s}{N_t + 1}$$

for different values of $N_s$. For all values of $$\frac{N_s}{N_t + 1} > 1,$$

the geometric mean correction factor is larger than 1. This implies that this scheme encourages further aggressive load balancing by increasing the metric $S_{k,GM}^{s,t}$ when the source cell has more UEs than the target cell. From FIG. 1, we can also see that the geometric mean multiplier term $\eta_{GM}^{s,t}$ is closer to 1 for the same ratio $$\frac{N_s}{N_t + 1}$$

but for larger values of $N_s$. It is found that it is more important to account for the geometric mean correction term when the number of active UEs in the source and target cell are widely different from each other, and for smaller number of active UEs per cell.

Interference Correction Factor

The above described schemes do not consider the impact caused on the dynamic inter-cell interference due to the TP switching of a UE.

For example, a UE that is switched to a lower SE but lightly loaded TP (for load-balancing reasons) will stay active for a longer period of time or consume larger amount of resources, thereby causing increased inter-cell interference.

Next, there is derived a modified TP switching metric that captures the impact of the change in the interference based on the GM-IL-DPS TP switching metric. Note that the change in interference affects only other UEs, so a system-wide optimization criterion is taken to capture the impact of a change in interference. This interference correction factor may be calculated without requiring any information from the neighboring TPs. The Channel state information (CSI) feedback from the UE for its source and target TPs is sufficient to calculate the interference correction factor. LTE Rel11 supports CSI reference signal (CSI-RS) and IMR (Interference measurement resources) coordination among TPs of the CoMP (Co-ordinated multipoint) set to report CQI for all the TPs in the CoMP set, as already described above with respect to document [1]. Hence no extra information is needed from the neighboring TP.

A marginal interference cost to a data rate of the UE i is defined as follows:

$$c_i = -\frac{\partial r_i}{\partial I_i} \tag{10}$$

where $r_i$ is the instantaneous data rate/spectral efficiency (hereinafter referred to as spectral efficiency only) of UE i and $I_i$ is the interference seen by UE i. The spectral efficiency of UE i, due to a change in interference of $\Delta I$, will change from ($r_i$) to ($r_i$)–$c_i\Delta I$. Thus, the TP switching metric of UE k for GM-IL-DPS scheme as given by equation (8) is modified to the following:

$$S_{k,IA}^{s,t} = S_{k,IL}^{s,t} \prod_{i \in A_s \cup A_t \setminus \{k\}} (1 - (c_i/r_i)\Delta I_{i,k}) \tag{11}$$

where $\Delta I_{i,k}$ is the change in the intercell interference observed at UE i caused by UE k switching to a new target TP. It is further assumed that $\Delta I_{i,k}$ is proportional to the UE k's resultant change in activity period due to it being switched to the target TP t, i.e.

$$\Delta I_{i,k} \propto Q_k \left(\frac{1}{r_k^t} - \frac{1}{r_k^s}\right) \tag{12}$$

where $Q_k$ is the current pending data queue size of UE k.
Substituting equation (12) in equation (11) results in $$S_{k,IA}^{s,t} = S_{k,IL}^{s,t} \prod_{i \in A_s \cup A_t \setminus \{k\}} 1 - \omega_{i,k}\left(\frac{1}{r_k^t} - \frac{1}{r_k^s}\right) \tag{13}$$

where $\omega_{i,k}$ is a positive weighting factor for UE i that absorbs all the scaling parameters in both equations (11) and (12), i.e.

$$\omega_{i,k} \propto \frac{Q_k c_i}{r_i}.$$

Computing $\omega_{i,k}$ may be complicated as it depends on multiple factors like $c_i$, the cross-channel gains of the UE i to the source and target TPs of the UE k, the current queue size of UE k etc.

Thus, instead, a configurable parameter $\omega$ is used to tune the algorithm in the absence of the accurate knowledge of $\omega_{i,k}$. Hence, equation (13) is simplified to $$S_{k,IA}^{s,t} = S_{k,IL}^{s,t}\left(1 - \omega\left(\frac{1}{r_k^t} - \frac{1}{r_k^s}\right)\right)^N \tag{14}$$

where N is the number of UEs in the entire network, whose interference is impacted by the switching of the UE k from source cell s to target cell t. Assuming that the term $\Delta I_{i,k}$ is small, the higher order terms with powers greater than 1 can be ignored such that the switching metric can be simplified to the following:

$$S_{k,IA}^{s,t} = S_{k,IL}^{s,t} \eta_{k,IA}^{s,t} \tag{15}$$

where $\eta_{k,IA}^{s,t}$ is given by $$\eta_{k,IA}^{s,t} = \left(\max\left(1 - \omega\left(\frac{1}{r_k^t} - \frac{1}{r_k^s}\right), 0\right)\right) \tag{16}$$

where the minimum limit of the interference correction multiplier term has been set to zero. The multiplier $$1 - \omega\left(\frac{1}{r_k^t} - \frac{1}{r_k^s}\right)$$

is the interference correction term and in order to prevent the term from being smaller than zero, in some embodiments of the invention, $$\max\left(1 - \omega\left(\frac{1}{r_k^t} - \frac{1}{r_k^s}\right)\right)$$

is used.

Further, in some embodiments of the invention, to prevent too large values of the term, the minimum with a certain max value greater than or equal to 1, say, even 1 could be used, i.e.

Min(max_value, $$\max\left(1 - \omega\left(\frac{1}{r_k^t} - \frac{1}{r_k^s}\right)\right))$$

While several approximations have been made in deriving the interference-correction term, it is noted that the TP switching metric in the above equation (15) has several desirable properties.

Namely, when the instantaneous rates of the UE from the source and the target TPs ($r_k^s$ and $r_k^t$) are the same, $S_{k,IA}^{s,t}$ becomes equal to $S_{k,IL}^{s,t}$, thereby causing no change to the TP switching metric.

In case the UE receives a poorer instantaneous rate in the target TP, then $\eta_{k,IA}^{s,t}<1$, thus discouraging a switch to the target TP, and vice versa.

We also absorbed several terms in the constant ω, which is used as a tunable parameter in the simulations. As mentioned above, the parameter ω is a positive weighting factor that absorbs the scaling parameter such as queue length, etc. In some embodiments of the invention, optimal results have been found for the value of approximately 0.3 for ω and this value could be used for all load conditions and scenarios. However, it is noted that the value of ω is of course not limited to approximately 0.3 and that any other suitable value could be used instead.

In some embodiments of the invention, an increased interference caused due to switching to a less loaded cell which is providing poor spectral efficiency to the UE can be prevented, for example.

In the following, some simulation results are presented comparing the performance of the different DPS schemes described above for bursty traffic model. The settings and parameters used in the simulations are listed below.
Settings and Parameters Used in the Simulations:
Bandwidth: 10 MHz
Carrier Frequency: 2 GHz
CoMP cluster: Ideal 57-cell clustering or "liquid" clusters
CoMP set: Best 3 cells within the CoMP cluster
Channel profile: SCM UMa (8 deg. azimuth spread)
UE speed: 3 km/h
Antenna Configuration: 2×2, single pair of cross-pole antennas both at Tx and Rx
Propagation scenario: 3GPP Macro Case 1
Inter-Site Distance (ISD): 500 m, 250 m
Traffic: Bursty traffic, 1 Mb packet sizes with an average packet inter-arrival time of 1 second
Scheduler: SU-MIMO, frequency-selective scheduling (RB and MCS allocation), Dynamic rank adaptation based on WB CSI, Inter-cell interference modeling is explicit (beamformed and frequency selective)
Number of UEs per sector: Random UE Drop: Average of 10 UEs per cell, exact number in each cell may vary
DPS TP switching period: 5 ms
CSI feedback and period: PUSCH Mode 3-1, sub-band CSI feedback every 5 ms
HO margin: 2 dB
PDCCH: Ideal
Channel estimation: Ideal knowledge with no delay
RE overhead: 4 out of 14 symbols
Target Block Error Rate: 10 percent The bursty traffic model with UEs dropped randomly in the simulation area simulates a load imbalanced traffic scenario in which the load in a TP is directly proportional to the number of UEs dropped in the coverage area of a TP. "Liquid clusters" cooperation cluster allow the TPs to choose their UE's CoMP set of three TPs from the entire set of its neighboring TPs based on the UE's RSRP measurements. As mentioned above, geometric mean (GM) of UE throughputs is used as the performance metric to compare the different schemes.

Figure 2:
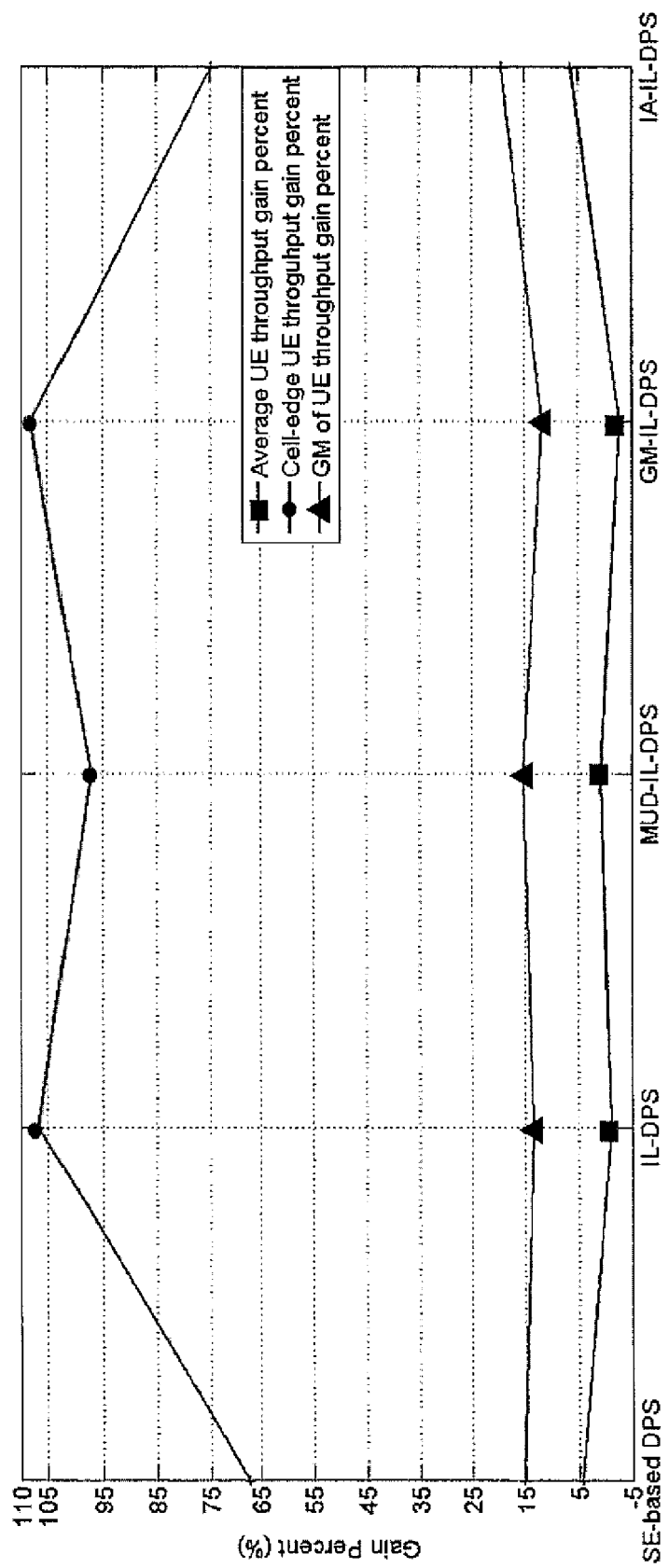
FIG. 2 is a diagram illustrating one example of percentage gains of different schemes over the baseline scheme without DPS for a load-imbalanced scenario.

Below table and FIG. 2 show one example of the throughput results and the corresponding percentage gains over the baseline scheme without DPS for a load-imbalanced scenario with average bursty traffic load of 10 Mbps per cell, respectively.

| DPS Scheme | Avg Tput(Mbps) | Cell-edge Tput(Mbps) | Geometric Mean(Mbps) | RB Utilization (%) |
|---|---|---|---|---|
| No DPS | 8.14 | 0.95 | 5.57 | 71.88 |
| SE-based DPS | 8.49(+4.3%) | 1.59(+67.43%) | 6.42(+15.26%) | 66.56 |
| IL-DPS | 8.04(−1.27%) | 1.96(+106.66%) | 6.32(+13.41%) | 77.76 |
| MUD-IL-DPS | 8.20(+0.77%) | 1.87(+97.24%) | 6.42(+15.22%) | 72.52 |
| GM-IL-DPS | 7.9 (−3%) | 1.98(+108%) | 6.22(+11.6%) | 79.8 |
| IA-IL-DPS | 8.66(+6.39%) | 1.66(+74.75%) | 6.65(+19.4%) | 69.20 |

In this example, it can be observed that the IL-DPS scheme provides the best cell-edge throughput gain at the expense of average UE throughput gains due to aggressive load balancing. Hence the GM metric is lower for the IL-DPS when compared to the SE-based DPS scheme. The GM-IL-DPS scheme, as mentioned above, encourages further aggressive load balancing without accounting for the changes in inter-cell interference due to the switching, and hence deteriorates the GM metric further. The MUD-IL-DPS scheme which discourages UEs being switched to a lightly-loaded TP from a heavy-loaded TP does improve the GM metric of the IL-DPS scheme. But this scheme still does not out-perform the SE-based DPS scheme.

In this example, the proposed IA-IL-DPS scheme provides the best GM metric of all the considered DPS schemes by providing the largest average UE throughput gains than any other scheme without much degradation of the cell-edge UE throughput gains. This right balance achieved in these two metrics (average UE throughput and cell-edge UE throughput gains) by the IA-IL-DPS scheme helps in improving the GM metric. In general, the cell-edge UE throughput gains are high (around the 75%-100% range) for all DPS schemes. This is mainly because of the load-balancing gains, where cell-edge UEs from the heavily-loaded cells are switched to the lightly-loaded cells and thus experience large improvement in their throughputs due to increased resource availability. However, unlike the other schemes, the IA-IL-DPS scheme can moderate the load-balancing switches by accounting for the extra interference caused by the poorer spectral-efficiency of the UE in the target cell. Large load imbalance results in IL-DPS making a larger spectral efficiency sacrifice to capitalize on the larger resource availability. However, by not accounting for the increased interference, IL-DPS compromises the average UE throughput and consequently also the geometric mean of UE throughputs. We can also observe that the SE-based DPS has the smallest average RB utilization percentage because the UEs are mostly served by their best serving TP. We observe that, in contrast, IL-DPS and GM-IL-DPS have large RB utilizations, which indicate that, to serve the same amount of traffic, more resource blocks are used, thus increasing the overall interference and degrading system performance.

Further, it is noted that, in theory, the two new multiplicative correction terms should be used together, as already mentioned above. However, in some embodiments of the invention, it has been seen that the interference correction term gives the largest gains, and the other term does not have that large an impact. This follows from the observation that we need a large difference between the number of UEs in the two cells and the number of active UEs in the cells to be small for this correction term to have an impact.

Moreover, it is observed that the values of this correction term are fairly small and these two terms tend to cancel each other out. We also observe that the gains observed with MUD-IL-DPS in the above table are due to the fact that MUD-IL-DPS tends to moderate the load balancing switches thus reducing the interference, which therefore has the same effect as IA-IL-DPS, to some extent.

In some embodiments of the invention, further enhancements to the IL-DPS scheme given in document [1] have been proposed. In realistic bursty-traffic scenarios with high load-imbalance among TPs, the IL-DPS scheme may suffer from aggressive load balancing. The two different proposed DPS schemes retain the structure and simplicity of the greedy user IL-DPS scheme. These schemes mainly consider the following three different effects due to UE switching to a new TP: GM metric improvement and the change in the inter-cell interference. Some embodiments of the invention can give a good system performance by providing a good balance between cell-edge and average UE throughput gains.

In summary, it is noted that some example versions of the present invention are mainly useful in realistic unbalanced bursty traffic load conditions. The interference correction weight used in the switching metric may only dependent on the considered UE's channel conditions to the different cells and hence can easily be implemented in a simple distributed architecture fashion. Minimal scheduling information needs to be exchanged between the cooperating TPs (e.g. current load information observed by the cells is exchanged).

Although some example versions of the present invention has mainly been described in the context of DPS, it is again noted that the proposed metric can also be used for other purposes like mobility load balancing and the like.

In the following, a more general description of some example versions of the present invention is made with respect to FIGS. 3 and 4.

Figure 3:
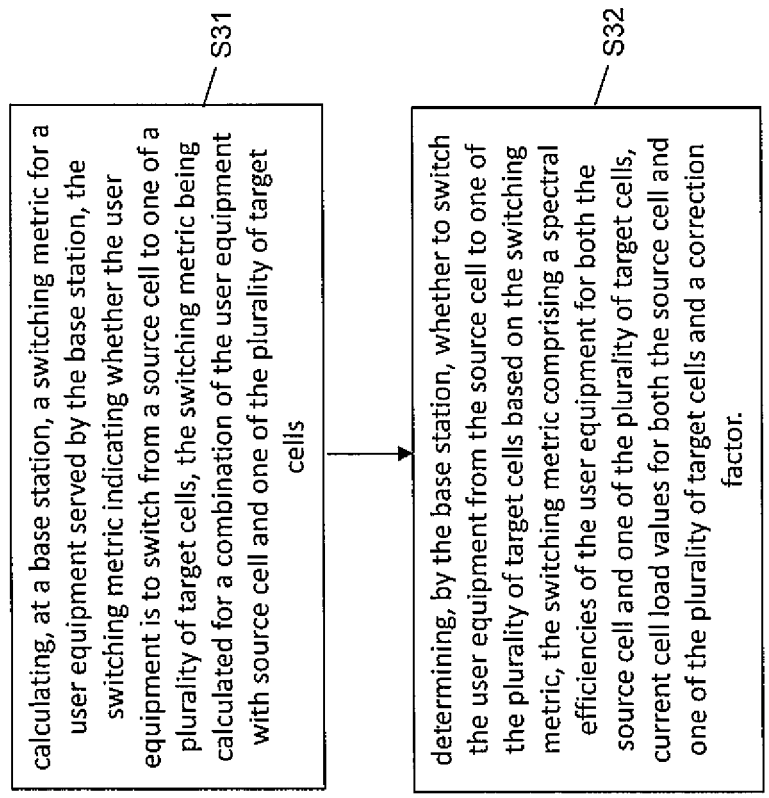
FIG. 3 is a flowchart illustrating an example of a method according to some example versions of the present invention.

FIG. 3 is a flowchart illustrating an example of a method according to some example versions of the present invention.

According to some example versions of the present invention, the method may be implemented in a base station, like a NodeB (NB) or evolved NodeB (eNB), or the like. The method comprises calculating, at a base station in a step S31, a switching metric for a user equipment served by the base station, the switching metric indicating whether the user equipment is to switch from a source cell to one of a plurality of target cells, the switching metric being calculated for a combination of the user equipment with source cell and one of the plurality of target cells, and determining, by the base station, whether to switch the user equipment from the source cell to one of the plurality of target cells based on the switching metric in a step S32. The switching metric comprising spectral efficiencies of the user equipment for both the source cell and one of the plurality of target cells, current cell load values for both the source cell and one of the plurality of target cells and a correction factor.

According to some example versions of the present invention, the method further comprises comparing the switching metric calculated for user equipments and switching the user equipment to the target cell for which the switching metric is the largest.

According to some example versions of the present invention, the method further comprises comparing the switching metric calculated for user equipments that consider the same source cell as its primary cell and switching the user equipment to the target cell among the plurality of target cells for which the switching metric is the largest.

Thus, according to some example versions of the present invention, there is a comparison of switching metrics across UEs and also a comparison across multiple switching metrics within the same UE.

According to some example versions of the present invention, the switching metric including the correction factor is calculated as follows:

$$S_{k,IA}^{s,t} = S_{k,IL}^{s,t} \eta_k^{s,t},$$

where $S_{k,IL}^{s,t}$ is the ratio of the achievable throughput on the target cell 't' to that in the source cell 's' considering the user equipment 'k' under switching for estimating the load of the target cell, and $\eta_k^{s,t}$ is the correction factor.

According to some example versions of the present invention, the correction factor takes into account an interference caused by the user equipment According to some example versions of the present invention, the correction factor $\eta_k^{s,t}$ for user equipment 'k' is calculated as follows:

$$\eta_k^{s,t} = \eta_{k,IA}^{s,t} = (1 - \omega_k \Delta I),$$

where $\omega_k$ is a positive weighting factor, and $\Delta I$ is given by $(1/r_k^t - 1/r_k^s)$, where $r_k^t$ is the spectral efficiency for user equipment 'k' of the target cell 't' and $r_k^s$ is the spectral efficiency for user equipment 'k' of the source cell 's'.

According to some example versions of the present invention, the weighting factor $\omega_k$ takes into account at least one of channel gains of the user equipments in other cells with respect to source cell 's' and target cell 't', a current queue size of the user equipment 'k', and a ratio of the throughput and the interference of the user equipments in other cells.

According to some example versions of the present invention, the factor $\eta_{k,IA}^{s,t}$ is calculated as follows:

$$\eta_{k,IA}^{s,t} = \min(\max\_value, \max(0, (1 - \omega_k \Delta I))),$$

where max_value is a predetermined value.

According to some example versions of the present invention, $\omega_k$ is predetermined.

According to some example versions of the present invention, the correction factor takes into account a number of currently active user equipments with non-zero queue sizes in the source cell and the target cell.

According to some example versions of the present invention, the correction factor $\eta_k^{s,t}$ for user equipment 'k' is calculated as follows:

$$\eta_k^{s,t} = \eta_{k,GM}^{s,t} = \left(\frac{N_s}{N_s - 1}\right)^{N_s - 1} \left(\frac{N_t}{N_t + 1}\right)^{N_t}$$

Where $N_s$ and $N_t$ are the number of currently active user equipments with non-zero queue sizes in source cell 's' and target cell 't'.

According to some example versions of the present invention, when $N_s=1$, then $$\left(\frac{N_s}{N_s-1}\right)^{N_s-1}$$

is set to unity.

According to some example versions of the present invention, when $N_t=0$, then $$\left(\frac{N_t}{N_t+1}\right)^{N_t}$$

is set to unity.

Figure 4:
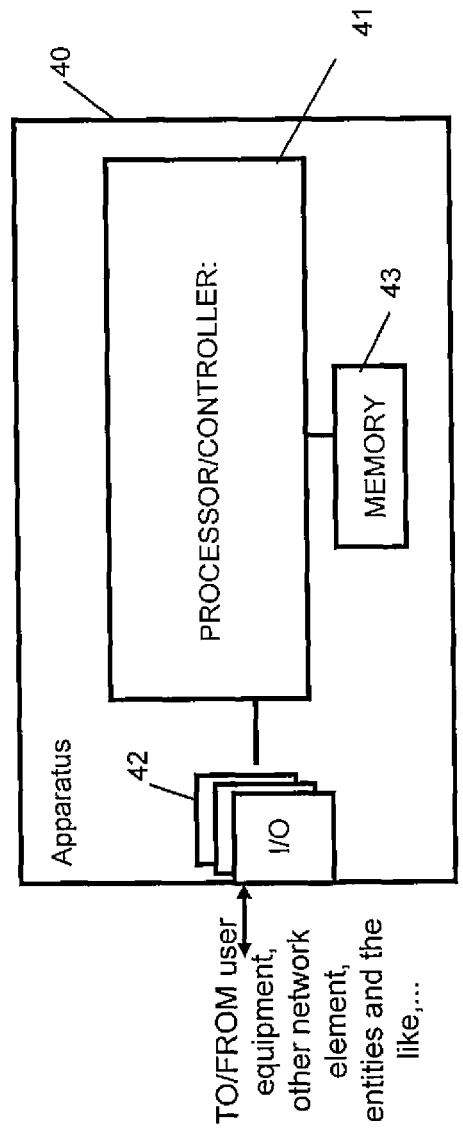
FIG. 4 is block diagram illustrating an example of an apparatus according to some example versions of the present invention.

FIG. 4 is a block diagram showing an example of an apparatus according to some example versions of the present invention.

In FIG. 4, a block circuit diagram illustrating a configuration of an apparatus 40 is shown, which is configured to implement the above described aspects of the invention. It is to be noted that the apparatus 40 shown in FIG. 4 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 40 may comprise a processing function or processor 41, such as a CPU or the like, which executes instructions given by programs or the like. The processor 41 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 42 denotes transceiver or input/output (I/O) units (interfaces) connected to the processor 41. The I/O units 42 may be used for communicating with one or more other network elements, entities, terminals or the like. The I/O units 42 may be a combined unit comprising communication equipment towards several network elements, or may comprise a distributed structure with a plurality of different interfaces for different network elements. The apparatus 40 further comprises at least one memory 43 usable, for example, for storing data and programs to be executed by the processor 41 and/or as a working storage of the processor 41.

The processor 41 is configured to execute processing related to the above described aspects. In particular, the apparatus 40 may be implemented in or may be part of a user equipment or the like, and may be configured to perform a method as described in connection with FIG. 3. Thus, the processor 41 is configured to perform detecting, at a user equipment, establishment of a connection to a cell, detecting, at the user equipment, a radio link failure of the connection, and transmitting, by the user equipment, a message to a base station serving the cell, the message including an indication from which it is derivable whether the radio link failure occurred within a predetermined time after the establishment of the connection.

According to some example versions of the present invention, the apparatus 40 may be implemented in or may be part of base station, like a NodeB (NB) or evolved NodeB (eNB), or the like, and may be configured to perform a method as described in connection with FIG. 3. Thus, the processor 41 is configured to perform calculating, at a base station, a metric for a user equipment served by the base station, the metric indicating whether the user equipment is to switch from a source cell to one of a plurality of target cells, the metric being calculated for a combination of the user equipment with at least one of the plurality of target cells, determining, by the base station, whether to switch the user equipment from the source cell to one of the plurality of target cells based on the metric, the metric comprising a spectral efficiency of the user equipment in a respective cell, calculating, by the base station, a factor for the metric indicating an interference caused by the user equipment.

For further details regarding the functions of the apparatus 40, reference is made to the description of the method according to some example versions of the present invention as described in connection with FIG. 3.

Thus, in view of the above, some example versions of the present invention provide a point selection algorithm comprising a switching metric having a correction factor. This correction factor is calculated by two different methods. The first method is by using a geometric mean (GM) correction factor which identifies a UE switch that maximizes overall system utility as opposed to a single UE's throughput. The second method is by using an interference correction factor that accounts for the change in interference and its consequent impact on other UEs' throughput while determining the system utility improvement.

Thus, according to some example version of the present invention, when the interference correction factor is applied with the load based metric, it balances the load in the cells and also reduces interference.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:

calculating, at a base station, a switching metric for a user equipment 'k' served by the base station, the switching metric indicating whether the user equipment 'k' is to switch from a source cell to one of a plurality of target cells, the switching metric being calculated for a combination of the user equipment 'k' with the source cell and the one of the plurality of target cells, determining, by the base station, whether to switch the user equipment 'k' from the source cell to the one of the plurality of target cells based on the switching metric, where the switching metric for user equipment 'k' is calculated as follows:

$$S_k^{s,t} = \max_t S_{k,JL}^{s,t} \eta_k^{s,t},$$

where $S_{k,JL}^{s,t}$ is a ratio of achievable throughput on the one of the plurality of target cells 't' to that in the source cell 's' considering the user equipment 'k' as switching to the one of the plurality of target cells, and $\eta_k^{s,t}$ is a correction factor and is calculated as follows:

$$\eta_k^{s,t} = (1 - \omega_k \Delta I),$$

where $\omega_k$ is a positive weighting factor and $\Delta I$ is given by $(1/r_k^t - 1/r_k^s)$, where $r_k^t$ is spectral efficiency for the user equipment 'k' of the one of the plurality of target cells 't' and $r_k^s$ is spectral efficiency for the user equipment 'k' of the source cell 's' and $\max_t$ is over all of the plurality of target cells for the user equipment 'k'.

2. The method according to claim 1, further comprising comparing the switching metric calculated for multiple user equipments in a set of active user equipments considered for switching, and switching the user equipment 'k' to the target cell for which the switching metric is larger than one and is the largest for that user equipment 'k' of the set of user equipments.

3. The method according to claim 2, further comprising determining the target cell 't' that maximizes the switching metric calculated for the user equipment 'k' and switching the user equipment 'k' to the target cell 't' among the plurality of target cells for which the switching metric is larger than 1 and is the largest.

4. The method according to claim 1, wherein the weighting factor $\omega_k$ is taking into account at least one of channel gains of user equipments in other cells with respect to source cell 's' and target cell 't', a current queue size of the user equipment 'k', and a ratio of the throughput and the interference of the user equipments in other cells.

5. The method according to claim 1, wherein the factor $\eta_k^{s,t}$ is calculated as follows:

$$\eta_k^{s,t} = \min(\max\_value, \max(0, (1 - \omega_k) \Delta I)),$$

where max_value is a predetermined value.

6. The method according to claim 1, wherein $\omega_k$ is predetermined.

7. The method according to claim 1, wherein the correction factor takes into account a number of currently active user equipments with non-zero queue sizes in the source cell and the target cell.

8. An apparatus comprising:

at least one processor, and at least one memory for storing instructions to be executed by the processor, wherein the at least one memory and the instructions are configured to, with the at least one processor, cause the apparatus at least to perform:

calculating, at a base station, a switching metric for a user equipment 'k' served by the base station, the switching metric indicating whether the user equipment 'k' is to switch from a source cell to one of a plurality of target cells, the switching metric being calculated for a combination of the user equipment 'k' with source cell and the one of the plurality of target cells, determining, by the base station, whether to switch the user equipment 'k' from the source cell to the one of the plurality of target cells based on the switching metric, where the switching metric for user equipment 'k' is calculated as follows:

$$S_k^{s,t} = \max_t S_{k,JL}^{s,t} \eta_k^{s,t},$$

where $S_{k,JL}^{s,t}$ is a ratio of achievable throughput on the one of the plurality of target cells 't' to that in the source cell 's' considering the user equipment 'k' as switching to the one of the plurality of target cells, and $\eta_k^{s,t}$ is a correction factor and is calculated as follows:

$$\eta_k^{s,t} = (1 - \omega_k \Delta I),$$

where $\omega_k$ is a positive weighting factor and $\Delta I$ is given by $(1/r_k^t - 1/r_k^s)$, where $r_k^t$ is spectral efficiency for the user equipment 'k' of the one of the plurality of target cells 't' and $r_k^s$ is spectral efficiency for the user equipment 'k' of the source cell 's' and $\max_t$ is over all of the plurality of target cells for the user equipment 'k'.

9. The apparatus according to claim 8, wherein the at least one memory and the instructions are further configured to, with the at least one processor, cause the apparatus at least to perform:

comparing the switching metric calculated for multiple user equipments in a set of active user equipments considered for switching, and switching the user equipment 'k' to the target cell for which the switching metric is larger than 1 and is the largest for that user equipment 'k' of the set of user equipments.

10. The apparatus according to claim 8, wherein the at least one memory and the instructions are further configured to, with the at least one processor, cause the apparatus at least to perform:

determining the target cell 't' that maximizes the switching metric calculated for the user equipment 'k' and switching the user equipment 'k' to the target cell 't' among the plurality of target cells for which the switching metric is larger than 1 and is the largest.

11. The apparatus according to claim 8, wherein the weighting factor $\omega_k$ is taking into account at least one of channel gains of the user equipments in other cells with respect to source cell 's' and target cell 't', a current queue size of the user equipment 'k', and a ratio of the throughput and the interference of the user equipments in other cells.

12. The apparatus according to claim 8, wherein the factor $\eta_k^{s,t}$ is calculated as follows:

$$\eta_k^{s,t} = \min(\max\_value, \max(0, (1 - \omega_k) \Delta I)),$$

where max_value is a predetermined value.

13. The apparatus according to claim 8, wherein the correction factor takes into account a number of currently active user equipments with non-zero queue sizes in the source cell and the target cell.

14. A computer program product including a non-transitory computer readable medium comprising a program for a processing device, comprising software code portions for performing the following when the program is run on the processing device:

calculating, at a base station, a switching metric for a user equipment 'k' served by the base station, the switching metric indicating whether the user equipment 'k' is to switch from a source cell to one of a plurality of target cells, the switching metric being calculated for a combination of the user equipment 'k' with source cell and the one of the plurality of target cells, determining, by the base station, whether to switch the user equipment 'k' from the source cell to the one of the plurality of target cells based on the switching metric, the switching metric for user equipment 'k' is calculated as follows:

$$S_k^{s,t} = \max_t S_{k,JL}^{s,t} \eta_k^{s,t},$$

where $S_{k,JL}^{s,t}$ is a ratio of achievable throughput on the one of the plurality of target cells 't' to that in the source cell 's' considering the user equipment 'k' as switching to the one of the plurality of target cells, and $\eta_k^{s,t}$ is a correction factor and is calculated as follows:

$$\eta_k^{s,t} = (1 - \omega_k \Delta I),$$

where $\omega_k$ is a positive weighting factor and $\Delta I$ is given by $(1/r_k^t - 1/r_k^s)$, where $r_k^t$ is spectral efficiency for the user equipment 'k' of the one of the plurality of target cells 't' and $r_k^s$ is spectral efficiency for the user equipment 'k' of the source cell 's' and $\max_t$ is over all of the plurality of target cells for the user equipment 'k'.

15. The method according to claim 1, further comprising switching the user equipment 'k' to the one of the plurality of target cells.

16. The apparatus according to claim 8, wherein the at least one memory and the instructions are configured to, with the at least one processor, cause the apparatus at least to switch the user equipment 'k' to the one of the plurality of target cells.

17. The computer program product according to claim 14, wherein the program further comprises software code portions for performing the following when the program is run on the processing device: switching the user equipment 'k' to the one of the plurality of target cells.

* * * * *